(12) United States Patent
Yang et al.

(10) Patent No.: US 10,524,260 B2
(45) Date of Patent: Dec. 31, 2019

(54) DEVICE, SYSTEM AND METHOD FOR PREVENTING AUDIO LOSS

(71) Applicant: MOTOROLA SOLUTIONS, INC., Chicago, IL (US)

(72) Inventors: Yunhai Yang, Elgin, IL (US); Hans C. Sowa, Schaumburg, IL (US); Daniel J. Mcdonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/977,541

(22) Filed: May 11, 2018

(65) Prior Publication Data

US 2019/0349924 A1    Nov. 14, 2019

(51) Int. Cl.
| | |
|---|---|
| *H04W 72/04* | (2009.01) |
| *H04W 4/10* | (2009.01) |
| *H04W 76/45* | (2018.01) |
| *H04W 84/08* | (2009.01) |

(52) U.S. Cl.
CPC ......... *H04W 72/0446* (2013.01); *H04W 4/10* (2013.01); *H04W 72/0406* (2013.01); *H04W 76/45* (2018.02); *H04W 84/08* (2013.01)

(58) Field of Classification Search
CPC ... H04W 72/0446; H04W 76/45; H04W 4/10; H04W 72/0406; H04W 84/08
See application file for complete search history.

(56) References Cited

U.S. PATENT DOCUMENTS

| | | | |
|---|---|---|---|
| 9,042,356 B2 | 5/2015 | Chowdhary et al. | |
| 2003/0072295 A1* | 4/2003 | Maxemchuk | H04W 74/08 370/348 |
| 2010/0046451 A1* | 2/2010 | Tada | H04W 4/10 370/329 |
| 2012/0314598 A1* | 12/2012 | Sadek | H04W 16/14 370/252 |
| 2013/0322414 A1* | 12/2013 | Chowdhary | H04W 4/08 370/337 |
| 2017/0094664 A1* | 3/2017 | Lee | H04B 7/0452 |

* cited by examiner

*Primary Examiner* — Mohammad S Anwar
(74) *Attorney, Agent, or Firm* — Perry + Currier, Inc.

(57) ABSTRACT

A device, system and method for preventing audio loss is provided. A device receives scheduling data, for a plurality of timeslots, indicative of when different communication types are to occur in a present voicecall, the plurality of timeslots including at least one data timeslot for transmitting data on the present voicecall. When a state of the present voicecall associated with a potential collision with the data for transmission in the at least one data timeslot is determined, the device cancels transmission of the data in the at least one data timeslot.

20 Claims, 10 Drawing Sheets

| SUPERFRAME 0 | 0 | 1 | 2 | 3 | 4 | 5 | 6 | 7 | 8 | 9 | 10 | 11 |
|---|---|---|---|---|---|---|---|---|---|---|---|---|
| OUT | MAC_HANGTI<br>ME<br>W0-SF0/5/S10<br>W1-SF0/7/S11<br>W2-SF0/9/S12<br>W3-SF0/10/<br>S13 | | MAC_HANGTI<br>ME<br>W0-SF0/7/S11<br>W1-SF0/9/S12<br>W2-SF0/10/<br>S13<br>W3-SF1/1/S14 | | MAC_HANGTI<br>ME<br>W0-SF0/9/S12<br>W1-SF0/10/<br>S13<br>W2-SF1/1/S14<br>W3-SF1/3/S15 | | MAC_HANGTI<br>ME<br>W0-SF0/10/<br>S13<br>W1-SF1/1/S14<br>W2-SF1/3/S15<br>W3-SF1/5/S16 | | MAC_HANGTI<br>ME<br>W0-SF1/1/S14<br>W1-SF1/3/S15<br>W2-SF1/5/S16<br>W3-SF1/7/S17 | | | MAC_HANGTI<br>ME<br>GVCU<br>0,0,0,0,A10<br>W0-SF1/3/S15<br>W1-SF1/5/S16 |
| IN | | | | | | LOC10 | | LOC11 | | LOC12 | LOC13 | |
| A | | | | | | | | | | | | |
| SUPERFRAME 1 | | | | | | | | | | | | |
| OUT | MAC_ACTIVE | | MAC_ACTIVE | | MAC_PTT1 | | MAC_PTT0 | | 4V | | | MAC_ACTIVE<br>GVCU 25<br>A11,A12,A13,<br>0,0,0<br>W0-SF2/10/<br>S16W1-SF3/10/<br>S17 |
| IN | | LOC14 | | LOC15 | | | | | | | | |
| A | CANCEL 17<br>FAILED 14,15,<br>16 | | FAILED 15, 16 | | FAILED 16 | CANCEL16 | | | | | | |
| SUPERFRAME 2 | | | | | | | | | | | | |
| OUT | 4V | | 4V | | 4V | | 2V | | 4V | | | MAC_ACTIVE<br>GVCU 25<br>0,0,0,0,0,0<br>W0-SF3/10/<br>S17<br>W1-SF0/10/<br>S14 |
| IN | | | | | | | | | | | LOC16 | |
| A | | | | | | | | | | | | |

FIG. 8

DEVICE, SYSTEM AND METHOD FOR PREVENTING AUDIO LOSS

BACKGROUND OF THE INVENTION

Radio devices may communicate on channels using schedules where different time slots are used to transmit different types of data for example to a base station; such data may include voice data, a location, sensor data, an identifier and the like. The base station transmits the schedules (e.g. via scheduling data) to the radio devices in a voicecall using a traffic channel, the schedules depending on a state of the voicecall and/or a radio device. For example, such states may include active state (e.g. audio is being transmitted and/or received at the radio devices), a console take over state (e.g. a console device at a dispatch center may take over a call), a hangtime state (no audio is being transmitted on the voicecall), and the like. Transitioning between any two states is not always predictable and may depend on the randomness of behavior at the radio devices, which may lead to audio loss.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8 depicts a portion of another schedule where a device is transitioning from a hangtime state to transmitting and receiving voice data in a voicecall in accordance with some embodiments.

Figure 1:
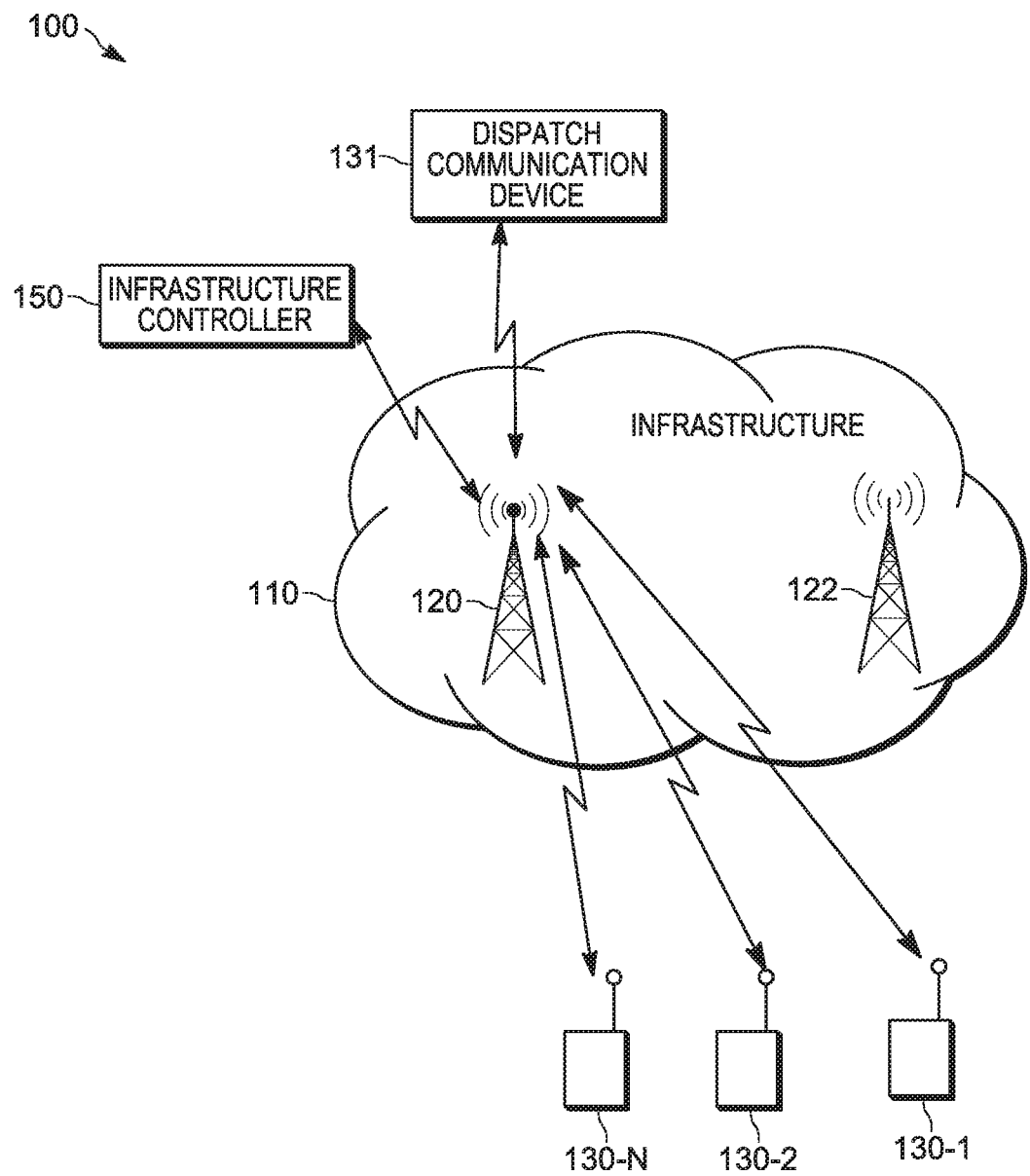
FIG. 1 is a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communications unit configured to conduct voicecalls; a hardware processor communicatively coupled to the communications unit, the hardware processor configured to: receive scheduling data, for a plurality of timeslots, indicative of when different communication types are to occur in a present voicecall, the plurality of timeslots including at least one data timeslot for transmitting data on the present voicecall; and when a state of the present voicecall associated with a potential collision with the data for transmission in the at least one data timeslot is determined, cancel transmission of the data in the at least one data timeslot.

Another aspect of the specification provides a method comprising: receiving, at a hardware processor communicatively coupled to a communications unit configured to conduct voicecalls, scheduling data, for a plurality of timeslots, indicative of when different communication types are to occur in a present voicecall, the plurality of timeslots including at least one data timeslot for transmitting data on the present voicecall; and when a state of the present voicecall associated with a potential collision with the data for transmission in the at least one data timeslot is determined, cancelling, at the hardware processor, transmission of the data in the at least one data timeslot.

FIG. 1 illustrates a wireless communication system 100 that includes an infrastructure 110 such as a communications network. There may be many distributed elements in the infrastructure 110, some local to each other and others disposed geographically distant from each other. Such elements include one or more base stations 120, 122 which provide connectivity for communication devices 130-1, 130-2 . . . 130-N disposed within the coverage area serviced by the base stations 120, 122 to other devices either in the same coverage area or in a different coverage area through the infrastructure 110. The communication devices 130-1, 130-2 . . . 130-N are interchangeably referred to hereafter, collectively, as the devices 130 and, generically, as a device 130. The devices 130 may alternatively be referred to as subscribers and/or subscriber units.

As depicted, the system 100 further includes a dispatch communication device 131 which is generally enabled to communicate with the devices 130 using radio communications and for which coverage is also provided by the one or more base stations 120, 122. Indeed, the devices 130 are understood by persons of skill in the art to communicate in voicecalls, for example in a talkgroup on a voice channel, using a protocol in which timeslots are used to schedule different types of communications on the voicecall. Talkgroups and voice channels are well known to one of skill in the art and thus will not be described in detail. Furthermore, communications on voicecalls may occur using push-to-talk (PTT) protocols, which are also well known to one of skill in the art and thus will not be described in detail.

Hereafter, while reference may be made to functionality and/or processes may be described with reference to a device 130, it is understood by persons of skill in the art that such functionality and/or processes may also occur at the dispatch communication device 131, unless otherwise indicated.

One or more base stations 120, 122 retransmits the information it receives. The base stations 120, 122 each may comprise a plurality of base stations and/or repeaters that are capable of receiving and retransmitting messages amongst the devices 130. One of the base stations 120, 122 may be local to a particular device 130 (e.g. to service a particular device 130) and act as a slave to another of the base stations 120, 122.

At least one of the base stations 120, 122 provide schedules and/or scheduling data to each of the devices 130; for example, as described herein, the base station 120 may transmit a schedule and/or scheduling data to a device 130 along with a device identifier to indicate that the schedule and/or scheduling data is for the device 130 having the device identifier. Such scheduling data may indicate that the schedule is changing between call states, as described below.

Such schedules and/or scheduling data indicate given data scheduled to be provided in timeslots on the voicecall. For example, the base station 120 may be used to allocate radio frequency (RF) communication resources amongst the devices 130 using such schedules and/or scheduling data, and some timeslots may be used to transmit voice data to one or more of the devices 130, other timeslots may be used to receive voice data from one of the devices 130, while yet other timeslots may be used to receive non-voice data from one of the devices 130.

The schedules and scheduling data will be described in further detail below, and a person of skill in the art will understand that, in protocols that use talkgroups, voice data and/or non-voice data transmitted by a given device 130 may be transmitted to the devices 130 in a timeslot, however, only one device 130 may be transmitting voice data and/or non-voice data in any given timeslot, otherwise a collision may occur, and one or more of the devices 130 may not receive voice data transmitted thereto.

Furthermore, the type of data transmitted or received in a timeslot generally depends on a call state of the voicecall. Such call states may be for all the devices 130 on the voicecall, or may be site specific (e.g. specific to a given device 130). For example, when no devices 130 are providing voice data on the voicecall, all the devices 130 on the voicecall may be in hangtime call state. When one of the devices 130 is transmitting voice data, that device 130 may be in a voice active call state; indeed, in PTT protocols, only one of the devices 130 may be providing voice data on a call at any given time. When any of the devices 130 is receiving voice data, but not sending voice data, those devices 130 may be in a voice inactive call state. Collisions may occur when a call state changes and/or a schedule changes, and/or when one or more of the devices 130 fails to receive a schedule and/or data due to, for example, poor radio-frequency (RF) reception, and the like.

Each of the devices 130 can be mobile or portable wireless radio units, cellular radio/telephones, or any other type of device capable of wirelessly communicating with the infrastructure. Examples of devices 130 include cellular telephones, personal digital assistants, or communication devices used by emergency personnel and may be coupled to other devices such as video terminals, portable computers, or the like.

The dispatch communication device 131 generally includes one or more dispatch consoles operated by one or more dispatchers, which may communicate with radio devices at the dispatch communication device 131 to communicate with the devices 130 in voicecalls. The dispatch communication device 131 and/or the dispatch consoles, may be configured to take over a voicecall, placing the voicecall in a console takeover call state. The dispatch communication device 131 may also cause the voicecall to be placed in a take-under call state such that a given device 130 in the talkgroup communicates privately with the dispatch communication device 131 (e.g. so that none of the other devices 130 on the voicecall can hear the voice data from the given device 130, other than the dispatch communication device 131).

As depicted, the system 100 may further comprise an infrastructure controller 150, or some other back-end infrastructure device or combination of back-end infrastructure devices existing "on-premises" (e.g. at the base station 120 (e.g. as a site controller and the like), and/or the dispatch communication device 131) and/or in a remote cloud compute cluster accessible to the infrastructure 110 and/or the devices 130 via an IP network (such as the Internet). The infrastructure controller 150 may communicate with therewith via a backend channel, for example to determine a state of a voicecall and communicate such a state to the base station 120 which, in turn, provides schedules and/or scheduling data to the devices 130 to communicate on the voicecall. For example, the infrastructure controller 150 may be in communication with the devices 130 via the backend channel to determine whether a device 130 has keyed up or de-keyed (e.g. as in a PTT protocol), and communicate such to the base station 120.

The infrastructure 110 may also comprise various other elements not shown in FIG. 1 including, but not limited to, one or more location servers, and the like. Such location servers may track locations of the devices 130 (e.g. device locations), for example, when the devices 130 transmit a respective location in the schedule. The infrastructure 110 may be connected to a number of additional content sources, such as the Internet or various Intranets and may comprise multiple interconnected zones, each containing a zone controller, other base stations and/or base sites, data servers, and the like. The infrastructure 110 may also be linked to a public switched telephone network (PSTN), and or other type of networks.

Figure 2:
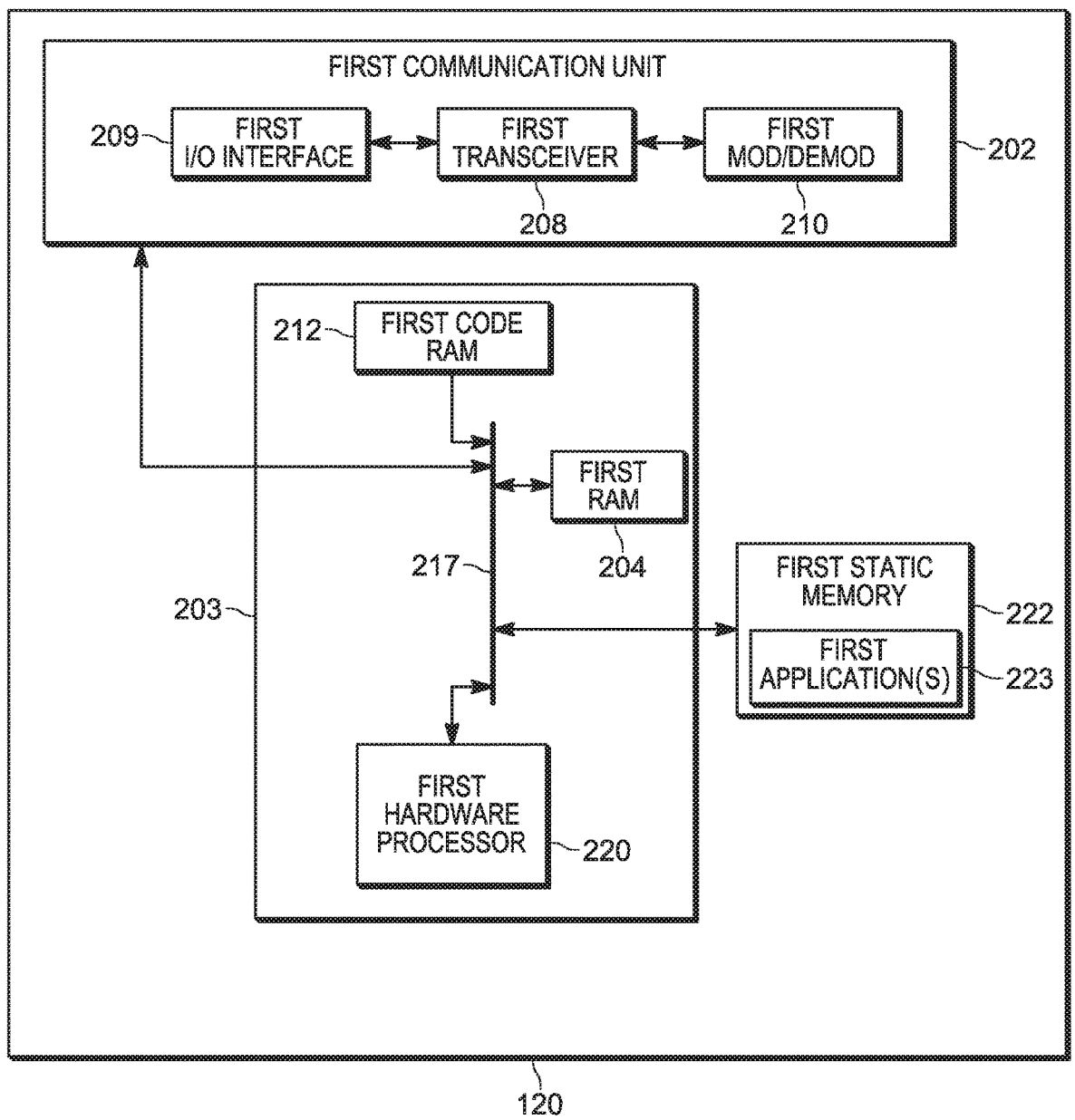
FIG. 2 is a device diagram showing a device structure of a base station in accordance with some embodiments.

Attention is next directed to FIG. 2 which sets forth a schematic diagram of an example embodiment of the base station 120. The base station 120 generally includes a first communications unit 202, a first hardware processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first hardware processor 220, and a first static memory 222 storing one or more first applications 223 for managing schedules of devices 130 on a voicecall. The base station 120 is described hereafter in further detail.

As shown in FIG. 2, the base station 120 includes the communications unit 202 coupled to the common data and address bus 217 of the processing unit 203. The processing unit 203 may include the code Read Only Memory (ROM) 212 coupled to the common data and address bus 217 for storing data for initializing system components. The processing unit 203 may further include the hardware processor 220 coupled, by the common data and address bus 217, to the Random-Access Memory (RAM) 204 and a static memory 222.

The communications unit 202 may include wireless input/output (I/O) interfaces 209 that are configurable to communicate with the devices 130, as well as at least one respective antenna. For example, as depicted, the communications unit 202 may include one or more wireless transceivers 208 including a long-range wireless transmitter and/or transceiver that has a transmitter transmit range on the order of miles, e.g., 0.5-50 miles, or 3-20 miles (i.e., long-range in comparison to a short-range transmitter such as a Bluetooth™, Zigbee™, or NFC (near field communication) transmitter) with other communication devices and/or infrastructure 110, for example using the base stations 120, 122. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

Regardless, the communications unit 202 is understood by persons of skill in the art to operate according to a standard that uses schedules, and timeslots in schedules, to schedule communications. For example, the communications unit 202, and the base station 120, may be configured to schedule communications among the devices 130 according to a Time-Division Multiple Access (TDMA) standard and/or any other standard that operates according to schedules with timeslots, including, but not limited to, an European Telecommunications Standards Institute Digital Mobile Radio (ETSI-DMR) standard.

The hardware processor 220 may include ports (e.g. hardware ports) for coupling to other hardware components (e.g. a display screen, an input device, a speaker and/or a microphone, and the like).

The hardware processor 220 includes one or more logic circuits, one or more processors, one or more microprocessors, one or more ASIC (application-specific integrated circuits) and one or more FPGA (field-programmable gate arrays), and/or another electronic device. In some embodiments, the hardware processor 220 and/or the base station 120 is not a generic hardware processor and/or a generic device, but a device specifically configured to implement functionality for scheduling call states for the devices 130. For example, in some embodiments, the base station 120 and/or the hardware processor 220 specifically comprises a computer executable engine configured to implement functionality for scheduling call states for the devices 130.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the base station 120 as described herein are maintained, persistently, at the memory 222 and used by the hardware processor 220 which makes appropriate utilization of volatile storage during the execution of such programming instructions.

In particular, the memory 222 stores instructions corresponding to the one or more applications 223 (shown as first application(s) 223 in FIG. 2) that, when executed by the hardware processor 220, enables the hardware processor 220 to implement functionality for managing access authorizations of devices. In examples described hereafter, when the hardware processor 220 executes the one or more applications 223, the hardware processor 220 is enabled to: determine a respective call state of a device 130 communicating in a voicecall; and transmit a schedule and/or scheduling data for the respective call state to a respective device 130.

Hence, the one or more applications 223 may alternatively be referred to as scheduler applications as the one or more applications 223 may be used to manage call state scheduling for the devices 130. Indeed, different applications, of the one or more applications 223, may be used depending on a mode of call state scheduling. For example, one of the one or more applications 223 may be used to manage call state scheduling for a hangtime call state, while another application 223 may be used manage call state scheduling for a voice active call state. Hereafter, the one or more applications 223 will be interchangeably referred to as the application 223.

Figure 3:
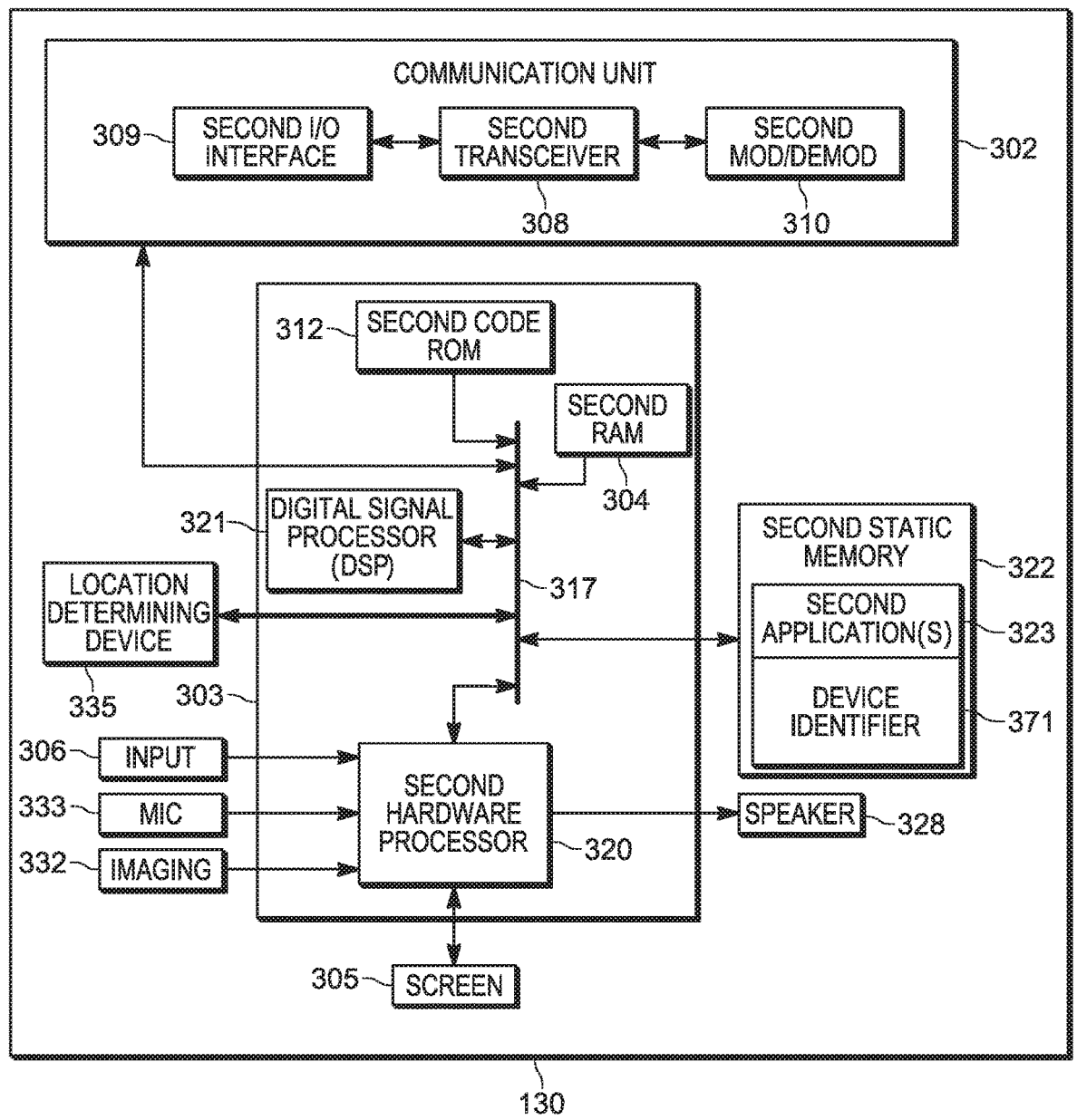
FIG. 3 is a device diagram showing a device structure of a communications device in accordance with some embodiments.

Attention is next directed to FIG. 3 which sets forth a schematic diagram that illustrates an example device 130. However, the schematic diagram of the example device 130 of FIG. 3 may also describe at least the radio components of the dispatch communication device 131. However, the dispatch communication device 131 may include fewer or additional components in configurations different from that illustrated in FIG. 3; regardless the components of FIG. 3 may be adapted for use with the dispatch communication device 131 and/or a dispatch console thereof.

As depicted in FIG. 3, the example device 130 generally includes a second communications unit 302, a second hardware processing unit 303, a second Random-Access Memory (RAM) 304, a display screen 305, an input device 306, one or more second wireless transceivers 308, one or more second wired and/or wireless input/output (I/O) interfaces 309, a second combined modulator/demodulator 310, a second code Read Only Memory (ROM) 312, a second common data and address bus 317, a second hardware processor 320 and/or a digital signal processor (DSP) 321, a second static memory 322 storing one or more second applications 323, a speaker 328, an imaging device 332, a microphone 333 and a location determining device 335. As depicted, the memory 322 further stores a device identifier 371.

However, while the device 130 is described with respect to including certain components, it is understood that the device 130 may be configured according to the functionality of a specific device. For example, one or more of the imaging device 332, the microphone 333 and/or other media components associated with the device 130 may be external to the device 130 and communicatively coupled thereto.

The example device 130 is described hereafter in further detail. As shown in FIG. 3, the device 130 includes the communications unit 302 coupled to the common data and address bus 317 of the processing unit 303. The device 130 may also include the one or more input devices 306 (e.g., keypad, pointing device, touch-sensitive surface, etc.) and the display screen 305 (which, in some embodiments, may be a touch screen and thus also act as an input device 306), each coupled to be in communication with the processing unit 303.

The speaker 328 may be present for reproducing audio that is decoded from voice or audio streams of calls received via the communications unit 302 from other devices 130, from other ad-hoc or direct mode devices, and/or from an infrastructure device, and the like. The microphone 333 may be present for capturing audio from a user that is further processed by the processing unit 303 and/or is transmitted as voice or audio data by the communications unit 302 to other portable radios and/or other communication devices. Hence, the combination of the speaker 328 and the microphone 333 may be used to communicate via channels and/or talkgroups.

The imaging device 332 may provide video (still or moving images) of an area in a field of view of the device 130 for further processing by the processing unit 303 and/or for further transmission by the communications unit 302 and which may also be used in communications via channels and/or talkgroups.

The location determination device 335 may comprise a global positioning system (GPS) receiver) and the like, generally configured to determine a respective location of the device 130. However, not all of the devices 130 may include the location determination device 335.

While not depicted, the device 130 may include other types of sensors that may acquire sensor data, including, but not limited to, biosensors, accelerometers, and the like.

The processing unit 303 may include the code Read Only Memory (ROM) 312 coupled to the common data and address bus 317 for storing data for initializing system components. The processing unit 303 may further include the hardware processor 320 and the DSP 321 coupled, by the common data and address bus 317, to the Random-Access Memory (RAM) 304 and the static memory 322.

The communications unit 302 may include one or more wired and/or wireless input/output (I/O) interfaces 309 that are configurable to communicate with other communication devices 130, the infrastructure controller 150 and/or a location server.

The communications unit 302 may include one or more wired and/or wireless input/output (I/O) interfaces 309 that are configurable to communicate with other devices 130. For example, as depicted, the communications unit 302 may include one or more wireless transceivers 308 including a long-range wireless transmitter and/or transceiver that has a transmitter transmit range on the order of miles, e.g., 0.5-50 miles, or 3-30 miles (i.e., long-range in comparison to a short-range transmitter such as a Bluetooth™, Zigbee™, or NFC (near field communication) transmitter) with other communication devices and/or infrastructure 110, for example using the base stations 120, 122. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

Regardless, the communications unit 302 is understood by persons of skill in the art to operate according to a standard that uses schedules, and timeslots in schedules, to schedule communications. For example, the communications unit 302, and the base station 120, may be configured to schedule communications among the devices 130 according to a Time-Division Multiple Access (TDMA) standard and/or any other standard that operates according to schedules with timeslots, including, but not limited to, an European Telecommunications Standards Institute Digital Mobile Radio (ETSI-DMR) standard.

The hardware processor 320 may include ports (e.g. hardware ports) for coupling to the display screen 305, the input device 306, the imaging device 332, the speaker 328 and/or the microphone 333.

The hardware processor 320 may comprise an applications processor for generally implementing applications of the device 130, while the DSP 321 may be configured to implement digital signal processing functionality of the device 130.

For example, the hardware processor 320 may receive voice data from the microphone 333, and provide the voice data to the DSP 321. The DSP 321 converts the voice data to a signal transmittable by the communications unit 302 and transmits the signal according to a schedule and/or scheduling data received from the base station 120.

Similarly, the DSP 321 may receive a signal corresponding to voice data received from another of the devices 130, according to the schedule and/or scheduling data, and convert the signal to voice data compatible with the speaker 328; the voice data is provided to the hardware processor 320, which in turn plays the voice data at the speaker 328. The DSP 321 may receive and/or transmit other types of data according to a schedule received from the base station 120; for example, the DSP 321 may transmit a location of the device 130, the device identifier 371 stored at the memory 322 (e.g. a Group Voice Channel User identifier (GVCU), a Media Access Control (MAC) address, and the like), and the like, as well as receive a schedule and/or scheduling data indicative of when such data is to be transmitted, as described in further detail below.

The hardware processing unit 303, hardware processor 320 and the DSP 321 each includes one or more logic circuits, one or more processors, one or more microprocessors, one or more ASIC (application-specific integrated circuits) and one or more FPGA (field-programmable gate arrays), and/or another electronic device, each adapted for the respective functionality of the hardware processor 320 and the DSP 321. In some embodiments, the hardware processor 320 may be slower than the DSP 321, such that the hardware processor 320 may take longer to adapt to a schedule update provided by the base station 120. For example, the DSP 321 may perform lower layer packet inspection and the hardware processor 320 may perform higher layer packet deep-inspection, which is a slower process than the lower layer packet inspection performed by the DSP 321.

In some embodiments, the hardware processing unit 303, the hardware processor 320 and the DSP 321 and/or the device 130 is not a generic hardware processor sand/or a generic device, but a device specifically configured to implement functionality for preventing audio loss. For example, in some embodiments, the hardware processing unit 303, the hardware processor 320 and the DSP 321 specifically comprises a computer executable engine configured to implement functionality for preventing audio loss.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the device 130 as described herein are maintained, persistently, at the memory 322 and used by the hardware processor 320 and/or the DSP 321 which makes appropriate utilization of volatile storage during the execution of such programming instructions.

In particular, the memory 322 stores instructions corresponding to the one or more applications 323 that, when executed by the hardware processing unit 303, (e.g. one or more of the hardware processor 320 and the DSP 321) to implement functionality for preventing audio loss. In illustrated examples, when the hardware processing unit 303 executes the one or more applications 323, the hardware processing unit 303 is enabled to: receive scheduling data, for a plurality of timeslots indicative of when different communication types are to occur in a present voicecall, the plurality of timeslots including at least one data timeslot for transmitting data on the present voicecall; and when a state of the present voicecall associated with a potential collision with the data for transmission in the at least one data timeslot is determined, cancel transmission of the data in the at least one data timeslot.

The one or more applications 323 may hence be alternatively referred to as audio loss prevention applications. Indeed, different applications, of the one or more applications 323, may be used depending on a mode of audio loss prevention. Hereafter, the one or more applications 323 will be interchangeably referred to as the application 323.

Figure 4:
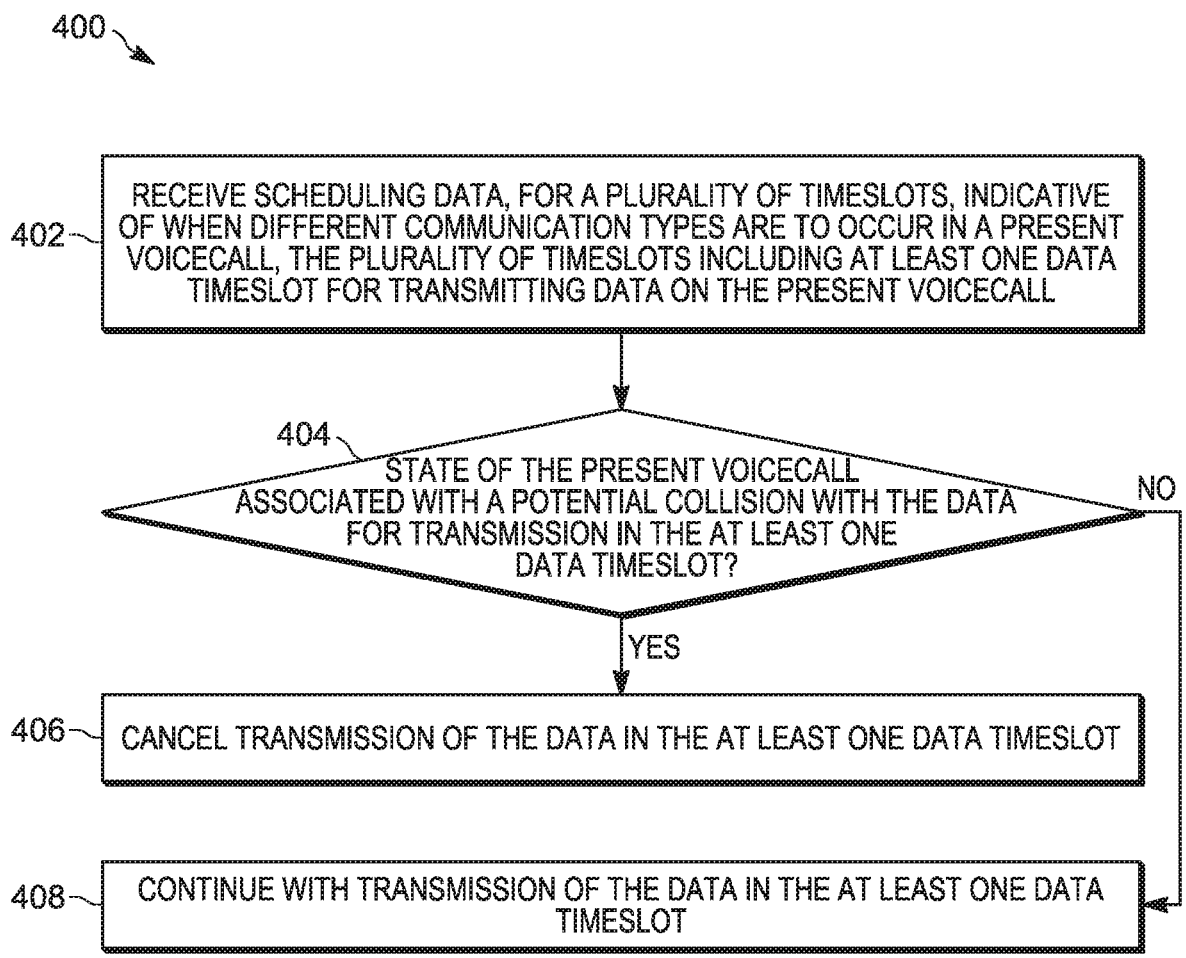
FIG. 4 is a flowchart of a method for preventing audio loss in accordance with some embodiments.

Attention is now directed to FIG. 4 which depicts a flowchart representative of a method 400 for preventing audio loss. The operations of the method 400 of FIG. 4 correspond to machine readable instructions that are executed by, for example, a device 130, and specifically by the hardware processing unit 303 of a device 130. In the illustrated example, the instructions represented by the blocks of FIG. 4 are stored at the memory 322 for example, as the application 323. The method 400 of FIG. 4 is one way in which the hardware processing unit 303 and/or the device 130 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present embodiments. In some embodiments, the hardware processor 320 may implement at least a portion of the method 400.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

At a block 402, the hardware processing unit 303 receives scheduling data, for a plurality of timeslots, indicative of when different communication types are to occur in a present voicecall, the plurality of timeslots including at least one data timeslot for transmitting data on the present voicecall. The scheduling data may be received from the base station 120 as described above.

At a block 404, the hardware processing unit 303 determines whether a state of the present voicecall is associated with a potential collision with the data for transmission in the at least one data. For example, a state associated with a potential collision may be determined when the voicecall is in a hangtime state and/or scheduled to transmit non-voice data in a slot used to transmit or receive voice in another slot, and the voicecall transitions to an active state, such as voice active state and the like. However, other examples of states associated with a potential collision are described in more detail below. Hence, such states associated with a potential collision may occur when a call state changes and/or a schedule changes due to a call state change.

When a state of the present voicecall is determined to be associated with a potential collision with the data for transmission in the at least one data timeslot (e.g. a "YES" decision at the block 404), at a block 406, the hardware processing unit 303 cancels transmission of the data in the at least one data timeslot.

When a state of the present voicecall is determined not to be associated with a potential collision with the data for transmission in the at least one data timeslot (e.g. a "NO" decision at the block 404), at a block 408, the hardware processing unit 303 continues with transmission of the data in the at least one data timeslot. For example, such states not associated with a potential collision may include states where data, schedule to be received, is transmitted or received according to the schedule and/or scheduling data.

Furthermore, in some embodiments as described below, the hardware processing unit 303 is further configured to determine the state of the present voicecall associated with a potential collision by: detecting that scheduling is changing between 4/4 scheduling, 1/4 scheduling and hangtime scheduling on the present voicecall. More specifically, the hardware processing unit 303 may be further configured to determine the state of the present voicecall associated with a potential collision by: detecting that scheduling is changing between, on the present voice call, two of: 4/4 scheduling, 1/4 scheduling and hangtime scheduling.

The method 400 is next described with respect to FIG. 5 to FIG. 10. In the following discussion, a person of skill in the art understands that timeslots (alternatively referred to as slots) of schedules may be a non-voice data timeslot and/or a voice timeslot, depending on a schedule and/or scheduling data. For example, in some slots of some schedules, non-voice data may be transmitted or received by a device 130, while in other slots voice data may be transmitted or received. Some slots may be either a data timeslot or a voice timeslot depending on a type of schedule.

Figure 5:
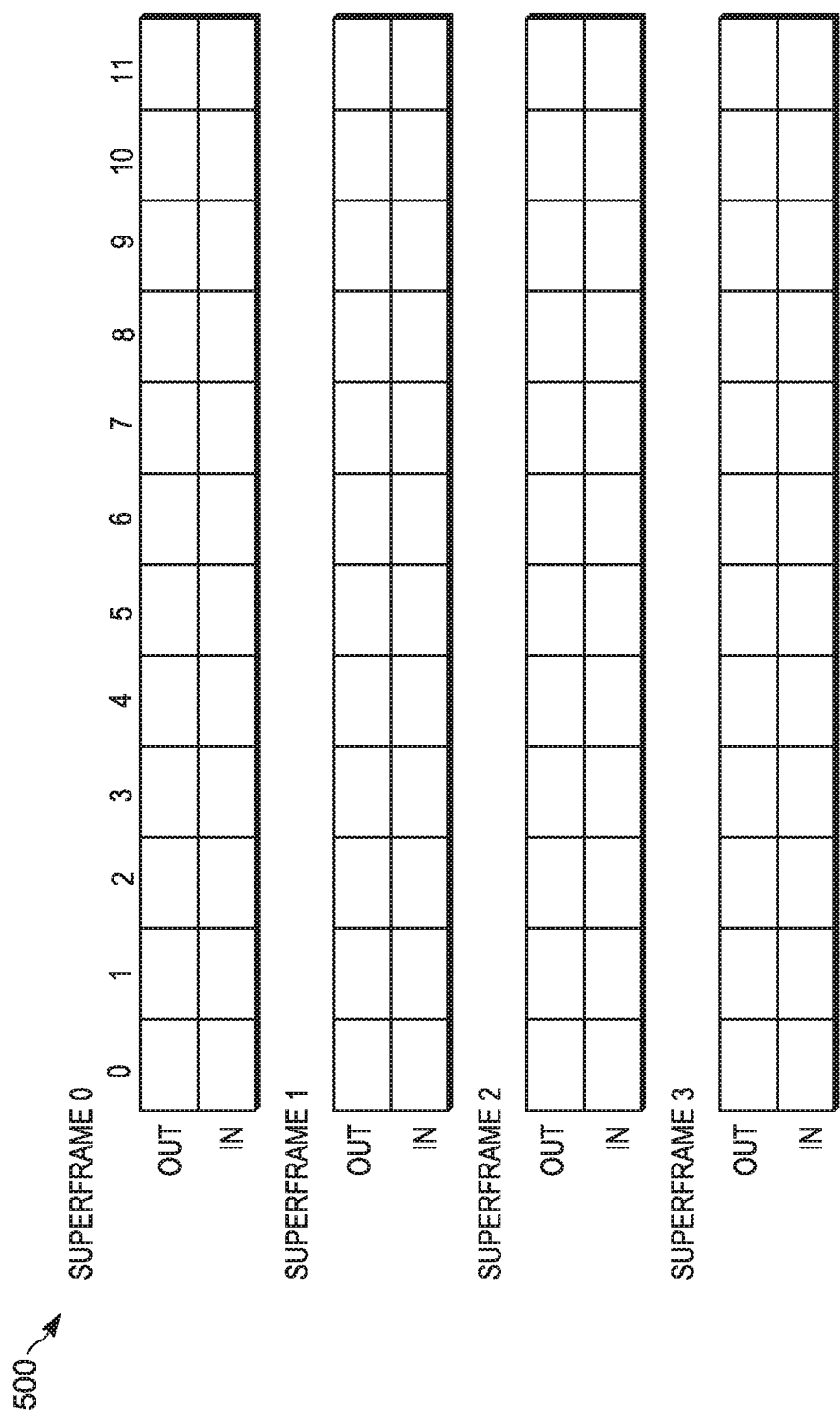
FIG. 5 depicts a structure of a schedule for devices on voicecall in accordance with some embodiments.

Attention is next directed to FIG. 5 which depicts a structure of a portion of a schedule 500 in accordance with some embodiments, and in particular an ultraframe. For example, in TDMA, an ultraframe is a set of four consecutive 360 millisecond (ms) superframes comprising a 1.44 second time interval. A superframe is a set of 2*6 timeslots of 30 ms each for two-slot TDMA, i.e. 360 ms (although in other embodiments, this may vary). The last two timeslots are inverted signaling slots.

Hence, FIG. 5 depicts a structure of an ultraframe comprising four superframes 0, 1, 2, 3 provide signaling information within a voice channel. Each superframe comprises 12 slots, as depicted, numbered 0 through 11.

The first 10 slots in each superframe, numbered 0 to 9, can be used for voice data (e.g. voice timeslots) or signaling information (e.g. data timeslots), depending on a type of schedule. When they are used for signaling they are called the Fast Associated Control Channel (FACCH). The last 2 slots in each superframe, numbered 10 and 11, may only be used for signaling information, and they are called the Slow Associated Control Channel, or SACCH. In other embodiments, however, a larger number of timeslots may be used. A voice channel (VCH) is composed of 5 traffic (Voice+signaling) or FACCH timeslots followed by a SACCH signaling timeslot. While not depicted, the schedule 500 may include Inter-slot Signaling Channels (ISCH) between each depicted slot.

For devices 130, each timeslot, when not idle, is occupied by a burst of voice, data, or control information (also called a burst) at a particular frequency dependent on which of the timeslots the burst occupies. In particular, in TDMA, bursts within each timeslot may be 27.5 ms long with 1.25 ms guard time (e.g. for the ISCH) at each end of the burst. As the timeslots may essentially operate independently according to the schedule, the following discussion will focus on only one set of timeslots used by a device 130, for example in one ultraframe (understanding that there are one or more intervening independent timeslots between each of the timeslots in the set of timeslots and more than one ultraframe).

Furthermore, as depicted and described in further detail below, each timeslot may be dedicated to transmitting data to a device 130 (e.g. from a base station 120, 122 to a device 130), or may be dedicated to receiving data transmitted from a device 130 (e.g. at a base station 120, 122 from a device 130). Hence, as depicted, each slot of each superframe of schedule 500 includes two rows, labelled "OUT" and "IN", where hereafter data transmitted to a device 130 will be located in the "OUT" row, and data transmitted from a device 130 will be located in the "IN" row.

Furthermore, while only 1 ultraframe is depicted, a person of skill in the art will appreciate that further ultraframes may follow the superframe 3.

In general, when a schedule and/or scheduling data is received, the schedule and/or scheduling data is for plurality of timeslots indicating the different communication types that are to occur in a present voicecall in the various timeslots; for example, a schedule and/or scheduling data may generally indicate whether voice data or non-voice data is to be received or transmitted in a given time slot, as well as a format and/or type of the voice data and/or non-voice data, as described hereafter.

Furthermore, as will be described hereafter, in some embodiments, for example when a device 130 is transmitting and receiving voice, a device 130 may operate according to 1/4 scheduling, where: slot 10 of the SACCH slots of the first three superframes (e.g. superframe 0, superframe 1, superframe 2) of an ultraframe may be used to transmit a device identifier of a voice transmitting device 130; and slot 10 of the last superframe (e.g. superframe 3) of an ultraframe may be used to schedule transmission of location data by the devices 130. Such 1/4 scheduling may occur at devices 130 where voice data is transmitted and received.

However, 4/4 scheduling may occur at devices 130 where voice data is received but not transmitted (e.g. a voice inactive call state), and hence the SACCH slot 10 of each of the superframes may be used to schedule transmission of location and/or other types of sensor data of the devices 130.

Similarly, hangtime scheduling may occur at devices 130 when in a hangtime call state, where each "inbound" slot 1, 3, 5, 7, 9, 10 of each of the superframes 0, 1, 2, 3 may be used to schedule transmission of location and/or other types of sensor data of the devices 130.

Figure 6:
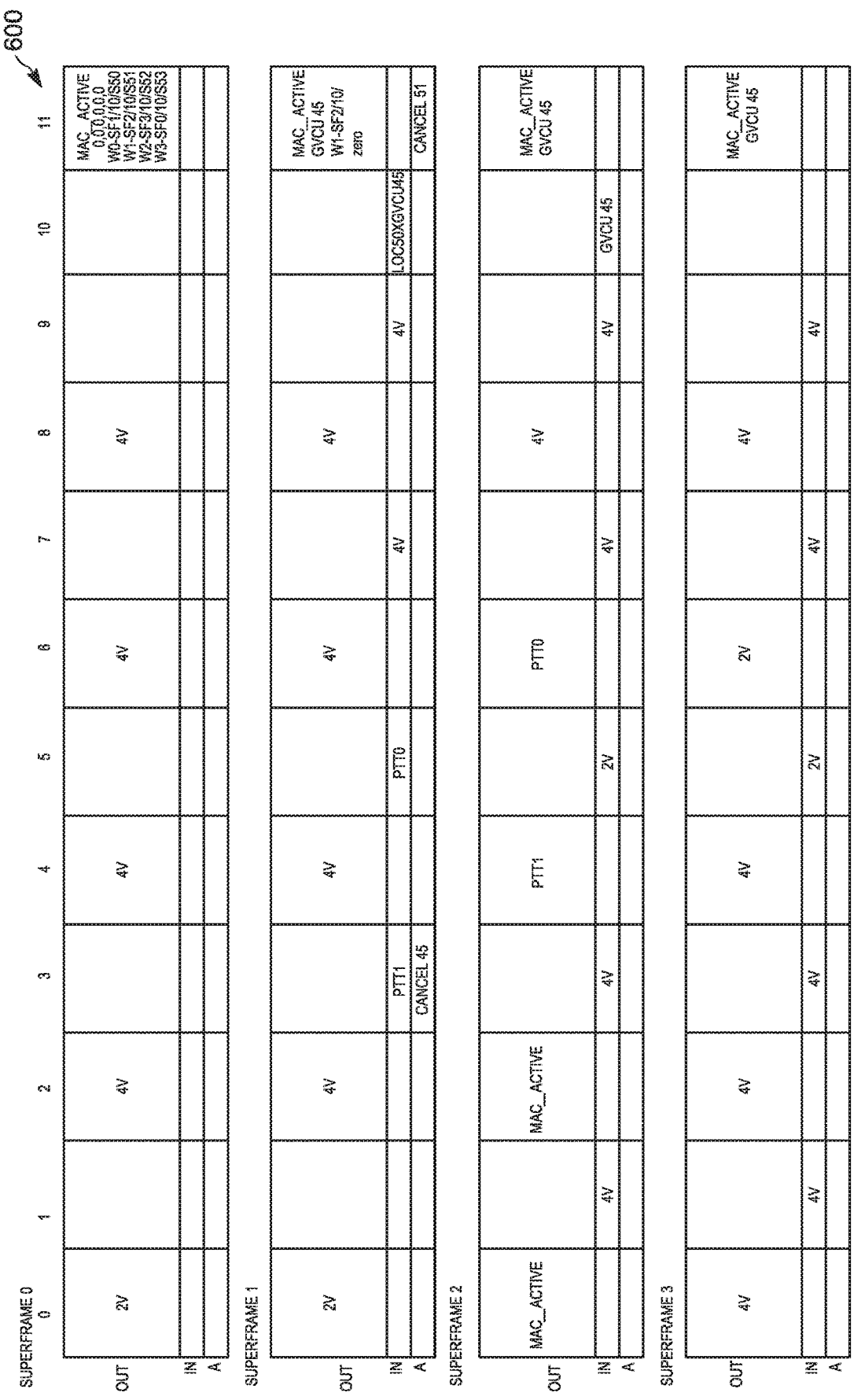
FIG. 6 depicts a portion of a schedule where a device is transitioning from a state where voice data is being received in a voicecall to a state where the device is transmitting and receiving voice data in a voicecall occur in accordance with some embodiments.

Attention is next directed to FIG. 6 which depicts a portion of a schedule 600 having the structure of the schedule 500, the schedule 600 being implemented at a device 130 having an identifier "45" and/or GVCU 45, to which voice data is initially being transmitted (e.g. by the base station 120), in a present voicecall. Hereafter a device 130 having an identifier "#" may also be referred to as being identified by "GVCU#". Furthermore, each superframe of the schedule 600 is depicted with an additional row labelled "A" showing activity at the devices 130 which may differ from the schedule 600, for example when a device 130 is implementing the method 400.

In particular, the schedule 600 is for a device 130 transitioning from an inactive voice state (e.g. initially receiving, but not transmitting voice data, for example due to a PTT key-up at another device 130) to an active voice state (e.g. due to a PTT key-up at the device 130). Hence, the schedule 600 is initially operating according to 4/4 scheduling and each slot 10 of each of the superframes may be used to schedule transmission of sensor data, such as location data, for devices 130 on the present voicecall.

As depicted, in superframe 0, in the row "OUT", "2V" voice frames (e.g. voice data) are scheduled to be transmitted to the device 130 at slot 0, while "4V" voice frames are scheduled to be transmitted to the device 130 at FACCH slots 2, 4, 6, 8. In general, 2V voice frames include decoding data (e.g. to decode voice, for example in 4V voice frames; hence 4V voice frames are generally preceded by 2V voice frames).

The slots 10, 11 are used for SACCH signaling. The slot 10 of the first superframe 0 initially has no data scheduled for transmission as scheduling data (generally received in slot 11 when a device 130 is receiving voice), has not yet been received. Such scheduling data is used to receive scheduling non-voice data transmission in slot 10 of future superframes.

As the schedule 600 is initially for 4/4 scheduling, at the slot 11 of superframe 0, scheduling data indicates that: at the superframe 1, in SACCH slot 10, a device 130 having an identifier "50" is scheduled to transmit its location (e.g. "SF1/10/S50"); at the superframe 2, in SACCH slot 10, a device 130 having an identifier "51" is scheduled to transmit its location (e.g. "SF2/10/S51"); at the superframe 3, in SACCH slot 10, a device 130 having an identifier "52" is scheduled to transmit its location (e.g. "SF3/10/552"; and at the superframe 0 in SACCH slot 10, of the next ultraframe, a device 130 having an identifier "53" is scheduled to transmit its location (e.g. "SF0/10/S53"). The nomenclature "S#" of the scheduling data identifies a device 130 with a GVCU with a respective number ("#"); the term "S" refers to the term "subscriber" and indeed, the devices 130 may interchangeably be referred to as "subscribers". Furthermore, while the devices 130 are described herein as transmitting location data acquired, for example, by a location determining device 335, the devices 130 may alternatively be scheduled to transmit any type of sensor data acquired by sensors at a respective device 130, for example biosensor data from biosensors, accelerometer data from accelerometers, and the like.

However, the schedule 600 transitions from a voice inactive call state to a voice active call state. In particular, at slots 3 and 5 of the superframe 1, "PTT1" and "PTT0" data are respectively transmitted (e.g. in inbound slots) by the device 130 operating according to the schedule 600, indicating that a key-up has occurred at the device 130 (e.g. an operator of the device 130 has actuated a PTT key) and hence the device 130 is changing from a voice inactive call state mode to a voice active mode, and hence will be changing from 4/4 scheduling to 1/4 scheduling.

While not depicted, data indicating the key-up is furthermore transmitted via a back channel to the infrastructure controller 150 (e.g. prior to the PTT1, PTT0 data being transmitted) which is in turn communicated to the base station 120 via the back channel from the infrastructure controller 150 to cause the base station 120 to change the schedules for the devices 130, for example by sending out updated scheduling data in next available timeslot: however, the next available time slot is slot 11 of the superframe 1. As such, collisions may occur until the updated scheduling data is received at a device 130.

Hence, the devices 130 operating according to the schedule 600 don't receive an updated schedule for a period of time as updated scheduling data is not received until slot 11 of the superframe 1. Nonetheless at the inbound slot 7 of the superframe 1, the device 130 begins to transmit voice data (e.g. "4V"); however, at the SACCH slot 10, a collision occurs, as the device 130, having changed from 4/4 to 1/4 scheduling, transmits the identifier GVCU45, while the device 130 having the identifier "50" transmits its location "L0050" (e.g. received at the base station 121 and not at the devices 130). The collision generally occurs at the base station 120 which will NACK (e.g. not acknowledge) receipt of either the identifier GVCU45 or the location L0050.

As depicted, at the slot 3 of the superframe 1 (e.g. the slot where the PTT1 is transmitted), the device 130 having the identifier 45 cancels (e.g. "CANCEL 45") the previous 4/4 scheduling (e.g. according to the scheduling data received at the slot 11 of the superframe 0). However, such a cancellation may occur at another slot, for example in an earlier slot where a key-up of a PTT key at the device 130 causes an indication of a call state change to be transmitted to the infrastructure controller 150 via the backchannel. Either way, such a change in call state may be indicative of potential collisions occurring in data timeslots and hence any previously scheduled transmission of location data in the slot 10 by the device 130 having the identifier 45 that is changing from 4/4 to 1/4 scheduling is cancelled (e.g. in favor of transmission of the device identifier).

In addition, as depicted in the slot 11 of superframe 1, the device 130 having the identifier 51, which had been scheduled its location in slot 10 of the superframe 2, also cancels its schedule (e.g. "CANCEL 51"). Hence, while the collision in the slot 10 of the superframe 1 may be challenging to avoid, such a cancellation by, the device 130 having the identifier 51 prevents future similar collisions.

Furthermore, the transition of the device 130 operating according to the schedule 600 from the voice inactive call state to the voice active call state (e.g. and also a transition from 4/4 scheduling to 1/4 scheduling), causes cancellation of transmission of sensor data on SACCH slot 10 of the next 4 superframes. Hence, for example, at the slot 11 of the superframe 1, new scheduling data is received which indicates that no devices 130 are scheduled to transmit sensor data ("SF2/10/zero") in at least the next 4 superframes, and furthermore includes "MAC_ACTIVE" data indicating that a device 130 has keyed up (e.g. the device 130 having the identifier 45). Hence, as depicted, in slot 10 of superframe 2 and superframe 3, no location data is scheduled to be transmitted; rather, at slot 10 of the superframe 2, the device 130 operating according to the schedule 600 transmits its identifier GVCU45 and no sensor data (e.g. location data) is scheduled to transmit on slot 10 of the superframe 3.

Hence, in these embodiments, the hardware processing unit 303 is configured to determine a state of the present voicecall associated with a potential collision by: detecting that a device 130 is changing between 4/4 scheduling and 1/4 scheduling on a present voicecall. Alternatively, in these embodiments, the hardware processing unit 303 is configured to determine a state of the present voicecall associated with a potential collision by: detecting that a device 130 is changing between states for transmitting voice and not transmitting voice on a present voicecall. Alternatively, in these embodiments, the hardware processing unit 303 is configured to determine a state of the present voicecall associated with a potential collision by: determining that at least one of the other devices 130 has been scheduled to transmit respective data in at least one data timeslot for transmitting data on the present voicecall (e.g. leading to a collision in non-voice data being transmitted as at the slot 10 of the superframe 1).

Figure 7:
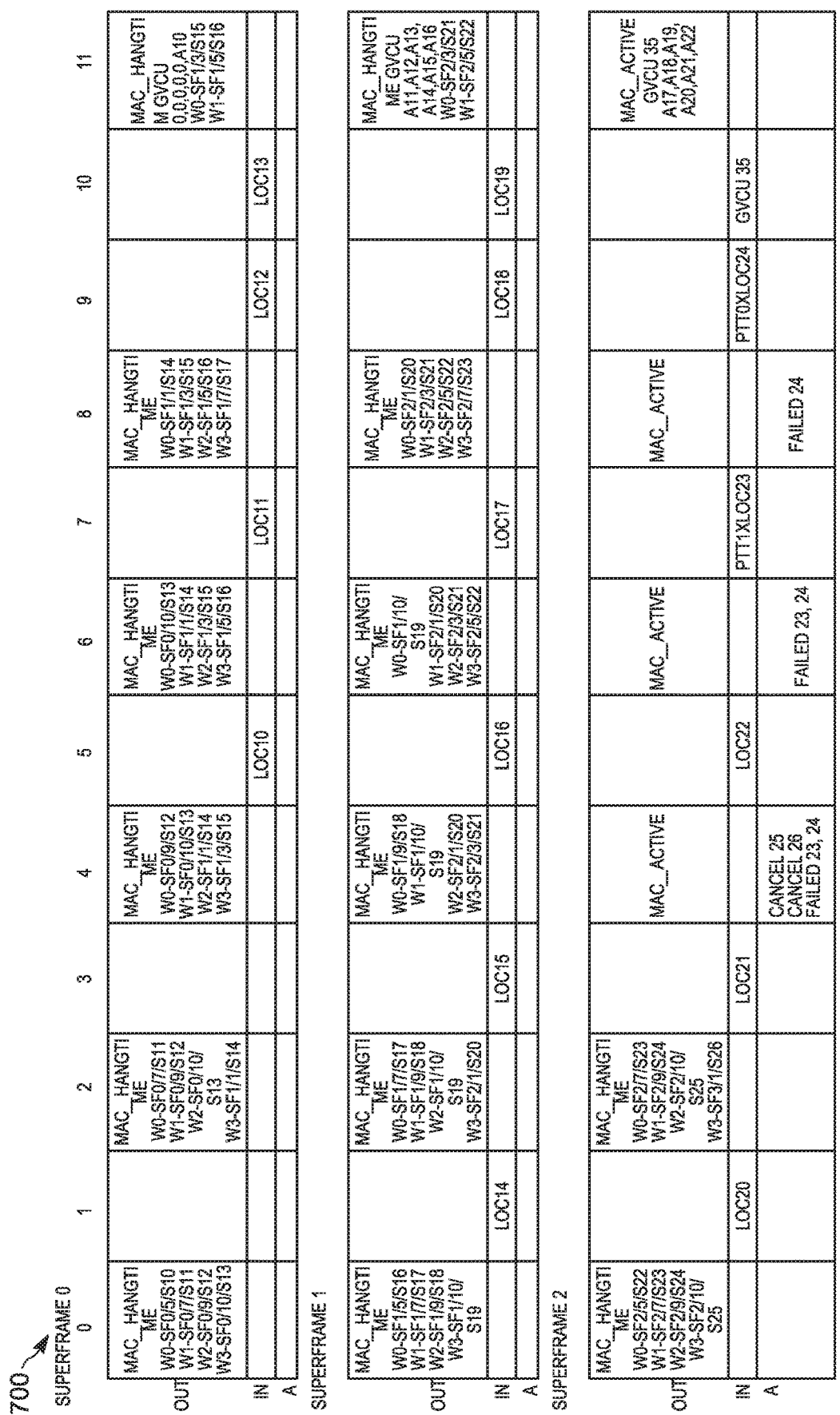
FIG. 7 depicts a portion of another schedule where a device is transitioning from a hangtime state to transmitting and receiving voice data in a voicecall in accordance with some embodiments.

Attention is next directed to FIG. 7 which depicts a portion of a schedule 700 having the structure of the schedule 500, the schedule 700 being implemented at a device 130 having an identifier "25" and/or GVCU 25, when a present voicecall is initially in a hangtime call state, and no devices 130 are transmitting voice data. While only three superframes 0, 1, 2 of an ultraframe are depicted, a superframe 3 is nonetheless understood to be present, as are further ultraframes.

The schedule 700 is hence initially operating according hangtime scheduling and each slot 1, 3, 5, 7, 9, 10 of each of the superframes 0, 1, 2, 3 may be used to schedule sensor data, such as location data, for any of the devices 130 on the present voicecall. As will be described below, the device 130 operating according to the schedule 700 transitions to transmitting voice data (e.g. in superframe 3) and hence changes from hangtime scheduling to 1/4 scheduling.

In the hangtime call state (e.g. hangtime scheduling), in each outbound slot 0, 2, 4, 6, 8 and 11, the base station 120 transmits scheduling data which indicates which device 130 is to transmit their location data in a given inbound slot 1, 3, 5, 7, 9, 10 of each superframe, the scheduling data structured similar to as described above with respect to the schedule 600. For example, the scheduling data of slot 0 of superframe 0 indicates that devices 130 having identifiers "10", "11", "12", "13" are to transmit their locations, respectively, in slots 5, 7, 9, and 10 of superframe 0. The scheduling data of slot 2 of superframe 0, indicates that devices 130 having identifiers "11", "12", "13" are to transmit their locations, respectively, in slots 7, 9, and 10 of superframe 0, and the device 130 having the identifier "14" is to transmit its location in slot 1 of superframe 1. The scheduling data continues to be received in this manner (where a schedule for a first device 130 is removed from beginning of the scheduling data, and a schedule for another device is added to the end of the scheduling data) while the present voicecall is in the hangtime state, which a slight difference in format for the scheduling data in the SACCH outbound slot 11, which includes a schedule of an acknowledgement ("A10") of receipt of the location of subscriber S10.

Furthermore, the schedule 700 depicts the scheduling of location transmission in the inbound slots that occur according to the scheduling data received in the outbound slots. For example, in the slot 5 of the superframe 0, the device 130 having the identifier "10" is scheduled to transmit respective location data "LOC10", etc.

A person of skill in the art understands that at the slot 4 of the superframe 2, the schedule and/or the scheduling data changes, for example due to a key-up at the device 130, which may be communicated via the backchannel to the infrastructure controller 150, and in turn communicated to the base station 120, for example, in the slot 0 of the superframe 2.

Hence, at each of the slots 4, 6, 8 of superframe 2, "MAC_ACTIVE" data is transmitted by the base station 120 to indicate a change in the call state of the present voice call, and the schedule 700. However, there is a delay in the device 130 operating according to the schedule 700 transmitting the PTT1, PTT0 data, which are not transmitted until slots 7 and 9, respectively, of the superframe 2.

As depicted in FIG. 7, the devices 130 having the identifiers "23" and "24" fail to receive and/or decode the "MAC_ACTIVE" at the slots 4, and 6 (e.g. "FAILED 23, 24" in the "A" row), and the device 130 having the identifier 24 fails to receive and/or decode the MAC_ACTIVE of slot 8. Such failure may be due to poor reception. Alternatively, the devices 130 having the identifiers "23" and "24" may receive a "MAC_ACTIVE" but a processor thereof may be too slow to cancel a schedule. Either way, as depicted, a collision occurs at slots 7, 9 with the PTT1, PTT0 data and the devices 130 having the identifiers "23" and "24" transmitting their respective locations "LOC23", "LOC24" in the same slots 7, 9.

However, the devices 130 having the identifiers "25" and "26" may receive the "MAC_ACTIVE" at the slots 4, 6, and, as depicted, cancel their respective schedules, for example in slot 4, or another slot (e.g. "CANCEL 24" and "CANCEL 26" in row "A"); otherwise, if the devices 130 having the identifiers "25", "26" were not to cancel their schedules, there could be a collision with the transmission of the device identifier "GVCU 35" transmitted by the device 130 transmitting voice at slot 10 of superframe 2, and a collision with the transmission of the voice data transmitted at the slot 1 of superframe 3 (e.g. as the device 130 having the identifier "26" was scheduled to transmit its location in this slot). Such cancellation may include a DSP 321 of the devices 130 having the identifiers "25" and "26" ignoring location data provided for transmission by a respective hardware processor 320 within a given time window.

Furthermore, the scheduling data received at the slot 11 of the superframe 2 cancels all previously scheduled transmission of location data; hence, in slot 10 of superframe 3, no location data is scheduled for transmission (which would otherwise occur in 1/4 scheduling).

Hence, in these embodiments, the hardware processing unit 303 is configured to determine a state of the present voicecall associated with a potential collision by: detecting that a device 130 is changing between hangtime scheduling and 1/4 scheduling on a present voicecall. Alternatively, in these embodiments, the hardware processing unit 303 is configured to determine a state of the present voicecall associated with a potential collision by: detecting that a device 130 is changing between states for transmitting voice and not transmitting voice on a present voicecall.

Attention is next directed to FIG. 8 which depicts a schedule 800 in which a device 130 is changing from a hangtime call state and/or hangtime scheduling (e.g. where no devices 130 are transmitting voice data and/or no devices 130 have keyed up) to a call state where voice data is to be received but not transmitted and/or to 4/4 scheduling (e.g. a voice inactive call state). The hangtime call state occurs in superframe 0, and up to slot 11 of superframe 0. As in FIG. 7, superframes 0, 1, 2 are depicted, and superframe 3 is not depicted, though understood to be present. The change in the call state occurs when the device 130, where the key-up occurs, transmits data indicative of the key-up to the infrastructure controller 150 which in turn transmits data indicative of the key-up and the identifier of the device 130 where the key-up occurs to the base station 120, which changes the schedules of the devices 130 accordingly via the scheduling data.

In the hangtime call state depicted in FIG. 8, the devices 130 are scheduled to transmit their respective locations according to scheduling data received at the FACCH slots 0, 2, 4, 6, 8 of the superframe 0, the SACCH slot 11 of the superframe 0, and the FACCH slots 0, 2 of the superframe 1; hence, in a hangtime call state, the devices 130 are scheduled to transmit non-voice data in all "inbound" FACCH and SACCH slots. Scheduling data is scheduled in the "outbound" FACCH and SACCH slots.

For example, in slot 0 of superframe 0, the scheduling data "SF0/5/S10" indicates that a device 130 having a device identifier "10" (e.g. subscriber S10) is scheduled to transmit its location at slot 5 ("5") of superframe 0 ("SF0"). The remaining scheduling data indicates that the devices 130 having device identifiers "11", "12", "13" are scheduled to transmit their respective locations at respective slots 7, 9, 10 of superframe 0. The scheduling data in slot 0 is received with "MAC_HANGTIME" data indicating that the voicecall is in a hangtime call state.

At the slot 2 of the superframe 0, the scheduling data received is similar to the data received at the slot 0, however, the scheduling omits the scheduling data "SF0/5/S10" and appends scheduling data "SF1/1/S14" indicating that a device 130 having a devices identifier "14" (e.g. subscriber S14) is scheduled to transmit its location at slot 1 ("1") of superframe 1 ("SF1"). The hangtime scheduling continues in this manner for each of the FACCH slots 4, 6, 8, as well as the SACCH slot 11 of the superframe 0, and FACCH slots 0, 2 of the superframe 1, such that transmission of locations is scheduled for devices 130 having identifiers 10, 11, 12, 13, 14, 15, 16, 17.

Indeed, at slots, 5, 7, 9, 10 of the superframe 0, and at slots 1, 3 of the superframe 1, the respective devices 130 are scheduled to transmit their locations. At the slot 11 of superframe 1, the base station 120 further schedules an acknowledgement ("A10") of receipt of the location of subscriber S10.

A person of skill in the art understands, for example by comparing the schedules 700, 800 to the schedule 600 that the FACCH slots used to transmit the locations are used to transmit voice data when not in a hangtime call state. Hence, when the schedule is changed from hangtime scheduling to 4/4 scheduling (e.g. voice inactive schedule), if the transmission of locations is not cancelled, a collision may occur with voice data being received at the device 130, similar to as described above with respect to FIG. 8.

Hence, when the "MAC_ACTIVE" data is transmitted by the base station 120 at the slot 0 of the superframe 1, the devices 130 having identifiers 14, 15, 16, 17 are still scheduled to transmit their respective locations in slots that would be used to transmit voice data.

However, assuming the "MAC_ACTIVE" data is received at the device 130 having identifier 17 (e.g. in the slot 2 of the superframe 1), the transmission of its locations is cancelled, as indicated by "CANCEL 17" in the row "A".

However, in slot 2 of superframe 1, the "FAILED 14, 15, 16" in the row "A" indicates that the devices 130 having identifiers 14, 15, 16 failed to receive the "MAC_ACTIVE" data and/or fails to decode the "MAC_ACTIVE" data. Hence, the device 130 having the identifier 14 transmits its location in the slot 1 of the superframe 1, which may potentially collide with voice data. The base station 120 would NACK receipt of such location data.

Similarly, the base station 120 again transmits "MAC_ACTIVE" data at the slot 2, which again is not decoded and/or not received by the devices 130 having the identifiers 15, 16. Hence, the device 130 having the identifier 15 transmits its location in the slot 3 of the superframe 1, which may potentially collide with voice data. The base station 120 would NACK receipt of such location data.

Similarly, the base station 120 transmits a "PTT1" at the slot 4, which again is not decoded and/or not received by the device 130 having the identifier 16. However, in this instance, as the device 130 has not decoded data in at least two outgoing slots (e.g. slots 0, 2), the device 130 having the identifier 16 detects a state of the present voicecall associated with a potential collision and cancels its schedule at the slot 5 (e.g. the device 130 having the identifier 16 does not transmit its location in the slot 5 of the superframe 1, where it had been previously scheduled to be transmitted)

In contrast, as the device 130 having the identifier 17 receives the MAC_ACTIVE data in slot 0 of the superframe 1, the device 130 having the identifier 17 cancels its schedule.

Hence, the FACCH slots from slot 7 of superframe 1 and higher are clear of transmission of locations and/or scheduling data and the devices 130 are in a state for receiving voice data.

Hence, in these embodiments, the hardware processing unit 303 is configured to determine a state of the present voicecall associated with a potential collision by: detecting that at least one of the other devices 130 have entered a respective state for transmitting voice on a present voicecall.

Furthermore, as depicted in slot 11 of the superframe 1, scheduling data changes a slot for transmitting the location data of the device 130 having the identifier 16 from the slot 5 of the superframe 1 to the slot 10 of the superframe 2. Hence, in these embodiments, the hardware processing unit 303 may determine a state of the present voicecall associated with a potential collision by: determining that the at least one data timeslot for transmitting data on the present voicecall has changed from a first timeslot to a second timeslot.

Figure 9:
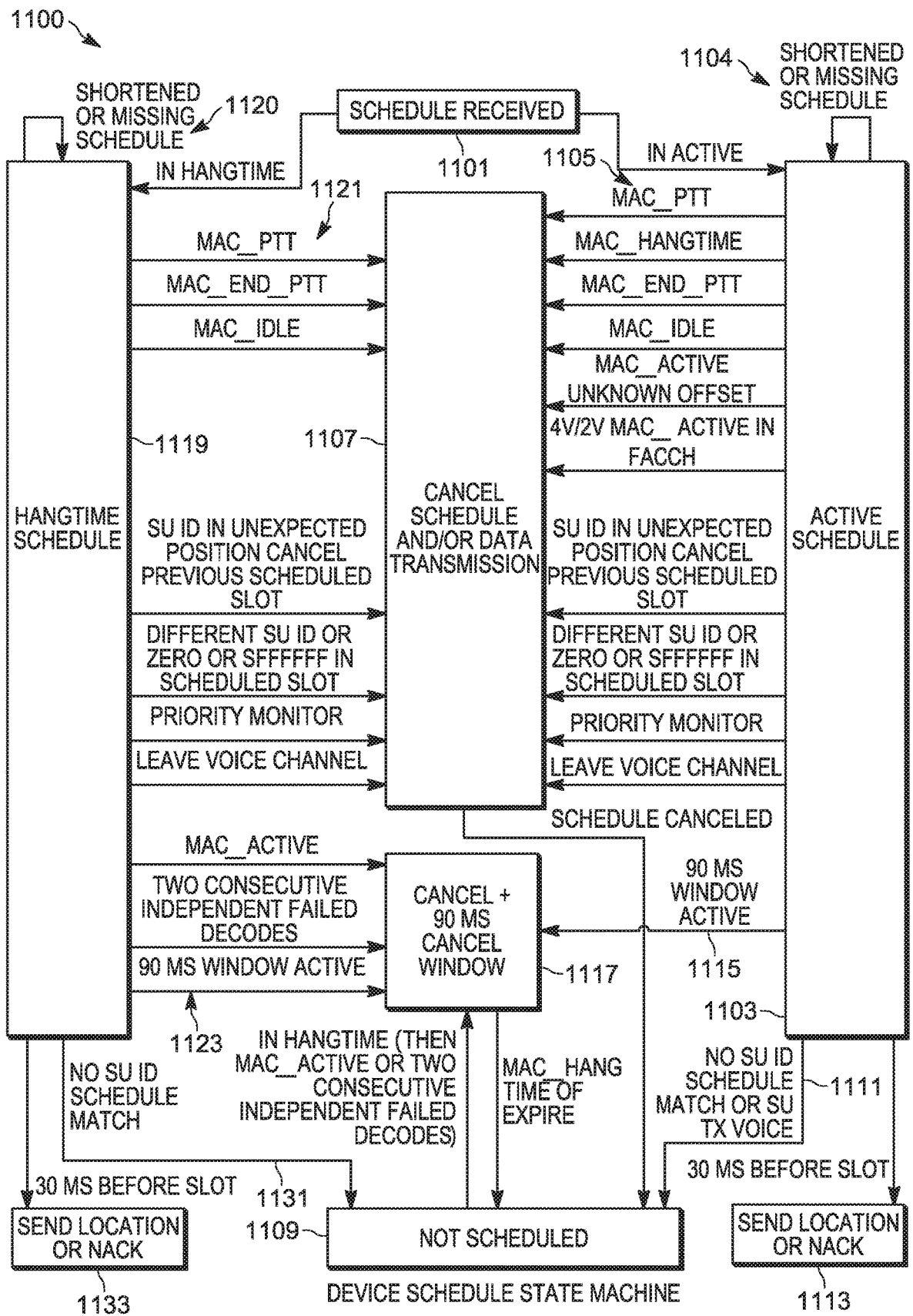
FIG. 9 depicts a device schedule state machine in accordance with some embodiments.

Attention is next directed to FIG. 9 which depicts a subscriber schedule state machine 1100 of a device 130 operating according to the method 400. It is assumed in FIG. 9 that the state machine 1100 is implemented by the device 130 of FIG. 2, for example the hardware processing unit 303 and/or the DSP 321 and/or the hardware processor 320 and/or a combination thereof.

As with the method 400, the blocks of the state machine 1100 need not be performed in the exact sequence as shown and likewise various blocks may be performed in parallel rather than in sequence. Accordingly, the elements of the state machine 1100 are referred to herein as "blocks" rather than "steps." The state machine 1100 of FIG. 9 may be implemented on variations of the system 100 of FIG. 1, as well.

At a block 1101, the hardware processing unit 303 receives a schedule for a present voicecall and determines whether the schedule is a hangtime schedule (e.g. an "inactive" schedule) or an "active" schedule (e.g. a schedule in which the device 130 is transmitting and/or receiving voice data.

When the schedule received is an active schedule, the hardware processing unit 303 (e.g. the DSP 321) implements the active schedule at the block 1103 to transmit and/or receive voice data in FACCH slots, as well as device identifiers and/or location data, and the like, in SACCH slots, using either 1/4 scheduling or 4/4 scheduling, as described above. The hardware processing unit 303 repeats 1104 the active schedule when the schedule is shortened and/or portions of the schedule are missing; in other words, when the hardware processing unit 303 reaches the end of the schedule, and a new schedule has not been received, the schedule is repeated.

The hardware processing unit 303 monitors scheduling data received in SACCH slots and/or voice data received in FACCH slots and/or data received in FACCH slots, as described above.

As depicted, when one or more states 1105 of the present voicecall associated with a potential collision with data for transmission in at least one data timeslot is determined (e.g. a collision with voice data and/or non-voice data) is determined, at a block 1107, the hardware processing unit 303 cancels the current schedule and/or the non-voice data to be transmitted. As depicted, the one or more states 1105 include, but are not limited to:

Receipt of a MAC_PTT data, indicating that a device is keying up and hence the device 130 is changing between 1/4 scheduling and 4/4 scheduling.

Receipt of MAC_HANGTIME data, indicating that the schedule is changing from an active schedule to a hangtime schedule.

Receipt of MAC_END_PTT data, indicating that a present voicecall is ending.

Receipt of MAC_IDLE data, indicating that a channel being used for the voicecall is no longer available.

Receipt of MAC_ACTIVE data with an unknown offset; for example, MAC_ACTIVE data is generally associated with an offset value indicating a given slot where 2V voice frames are to be received, the 2V voice frames including decryption data (e.g. a decryption key) used to decrypt the 4V voice frames received after the 2V voice frames. Hence, when MAC_ACTIVE data is received with an unknown offset, the schedule is cancelled.

When MAC_ACTIVE data is received in a FACCH slot, rather than 4V/2V voice frames.

When a device identifier (e.g. subscriber unit identifier or "SUID") is scheduled to be transmitted in an unexpected and/or unscheduled slot and/or position, which results in a cancellation and/or rescheduling of transmission of the device identifier in a previously scheduled slot.

When a different SUID is scheduled to be transmitted in a slot previously scheduled to transmit another SUID; alternatively, a Zero value and/or a $FFFFFF may be scheduled to be transmitted in a slot previously scheduled to transmit the another SUID.

The states 1105 may include other states where collisions may not occur, but where the schedule is also cancelled including, but not limited to:

Priority Monitor data is received; for example, when another call is occurring on a channel different from the present voicecall (e.g. using a talkgroup marked as a "priority" talkgroup at the device 130); the device 130 may configured to monitor whether the priority talkgroup becomes active and, if so, switch to the priority talkgroup on the other channel, resulting in cancellation of the schedule for the present voicecall. For example, a channel change indication may be received indicative of changing from a first channel, on which a present voicecall is occurring, to a second channel.

When the device 130 leaves the voice channel on which the present call is occurring (e.g. upon receipt of input at the input device 306).

Once the schedule is cancelled at the block 1107, the hardware processing unit 303 may wait for receipt of another schedule, and otherwise at a block 1109, the hardware processing unit 303 enters a no schedule state.

In some embodiments, when an active schedule is received, at the block 1103, the hardware processing unit 303 may determine (e.g. a state 1111) that the received schedule does not match its device identifier (e.g. the wrong schedule was transmitted, assuming the wrong schedule was transmitted with a device identifier) and/or that a schedule to transmit non-voice data has been received while the device 130 is transmitting voice (e.g. an active schedule for receipt of voice data, but not transmission of voice data is received). When such state 1111 is determined (e.g. a device 130 may not be scheduled due to its recent transmission of its location and/or scheduled while transmitting voice), the device 130 does not implement the schedule and at a block 1109, the hardware processing unit 303 enters a no schedule state; however, the device 130 may continue to receive and/or transmit voice data.

In some embodiments, for example, 30 ms before a slot in which a location is scheduled to be transmitted, at a block 1113 the location (and/or other sensor data) is transmitted and/or a NACK is transmitted. For example, a device 130 may include a ramp-up time to transmit data (e.g. a time between time slots), which may be 30 ms, less than 30 ms or greater than 30 ms, and the block 1113 occurs when a location is scheduled to be transmitted when a schedule is ending, and after the ramp-up time.

As described above, in some embodiments, the DSP 321 transmitting and receiving data according to a schedule may be faster than the hardware processor 320 from which data is being received for transmission. Hence, in these embodiments, when a state of a present voicecall associated with a potential collision is determined, for example at the DSP 321, the DSP 321 may abort all communications in the schedule for a present voicecall for a given time window.

The given time window may depend on a difference in speed between the DSP 321 and the hardware processor 320, however, as depicted, the given time window is 90 ms, however the given time window may be longer or shorter than 90 ms. Furthermore, the DSP 321 may abort all communications for a given time window regardless of a difference in speed between the DSP 321 and the hardware processor 320, for example due to differences in packet inspection therebetween.

When the given time window is active (e.g. the state 1115), and the hardware processor 320 provides data to the DSP 321 for transmission, at a block 1117, the hardware processing unit 303 cancels the schedule and all activity within a 90 ms window. The given time window may be activated when the device 130 is operating in a hangtime schedule, described below, and the schedule may change from hangtime to the active schedule during the given time window; in these instances, the active schedule to which the device 130 has been changed in the given time window is cancelled.

From the block 1117, when the device 130 is in a hangtime state, or the given window of time expires, the block 1109 is implemented such that the device 130 is not operating according to a schedule. The device 130 may nonetheless receive MAC_ACTIVE data when not operating according to a schedule and again cancel any activity on the voicecall and start the given window of time and/or when two consecutive failed decodes occur independent of one another).

Returning to the block 1101, when the schedule is a hangtime schedule, at a block 1119, the hardware processing unit 303 unit 303 monitors scheduling data received in SACCH slots and/or FACCH slots and/or data received in FACCH slots, as described above. The hardware processing unit 303 repeats 1120 the hangtime schedule when the schedule is shortened and/or portions of the schedule are missing; in other words, when the hardware processing unit 303 reaches the end of the schedule, and a new schedule has not been received, the schedule is repeated.

As depicted, when one or more states 1121 of the present voicecall associated with a potential collision with data for transmission in at least one data timeslot is determined (e.g. a collision with voice data and/or non-voice data) is determined, at the block 1107, the hardware processing unit 303 cancels the current schedule and/or the non-voice data to be transmitted. As depicted, the one or more states 1121 are similar to respective states 1105 including: receipt of MAC_PTT data; receipt of MAC_END_PTT data; and receipt of MAC_IDLE data; an SUID being in an unexpected slot and/or a different slot. The schedule may also be cancelled when" primary monitor data is received; and when the device 130 leaves the voice channel on which the present call is occurring.

However, when MAC_ACTIVE data is received and/or two consecutive independent failed decodes are determined, and/or when the given window of time is active (e.g. the 90 ms window) (e.g. states 1123), the hardware processing unit 303, and specifically the DSP 321, cancels the schedule at the block 1117 and further ignores all data received from the hardware processor 320 for the given window of time. The given window of time is activated in these states as the possibility of collisions may be higher with the states 1123 than with the states 1121. Again, the hardware processing unit 303, and specifically the DSP 321, transitions between a no schedule state at the block 1109, and cancelling (at the block 1117) any data received for transmission from the hardware processor 320 within the given window of time.

In some embodiments, the hardware processing unit 303 may determine (e.g. a state 1131) that the received schedule does not match its device identifier and enter a no schedule state at the block 1109.

In some embodiments, for example, 30 ms before a slot in which a location is scheduled to be transmitted, at a block 1133 the location (and/or other sensor data) is transmitted and/or a NACK is transmitted, as described above.

Figure 10:
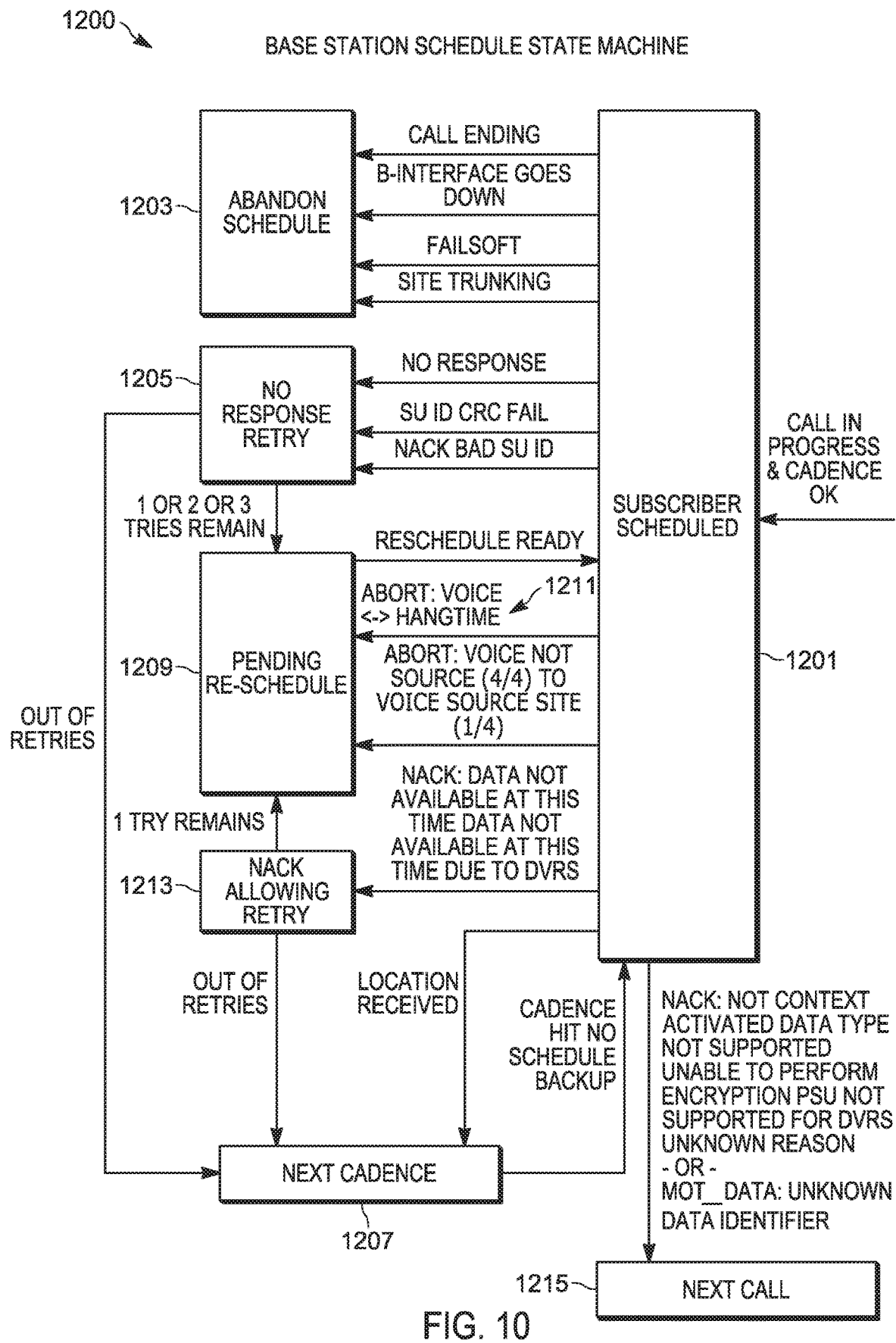
FIG. 10 depicts a base station scheduler state machine in accordance with some embodiments.

Attention is next directed to FIG. 10 which depicts a base station schedule state machine 1200 of the base station 120 implementing the one or more applications 223. It is assumed in FIG. 10 that the state machine 1200 is implemented by the hardware processing unit 203.

As with the method 400, the blocks of the state machine 1200 need not be performed in the exact sequence as shown and likewise various blocks may be performed in parallel rather than in sequence. Accordingly, the elements of the state machine 1200 are referred to herein as "blocks" rather than "steps." The state machine 1200 of FIG. 10 may be implemented on variations of the system 100 of FIG. 1, as well.

Furthermore, the state machine 1200 is generally described with reference to sending schedules to one device 130, however the state machine 1200 may be used to send schedules to all the devices 130.

At block 1201, the hardware processing unit 203 receives an indication of a voicecall in progress (e.g. among the devices 130), and that the "cadence" for the call is "OK" (e.g. a schedule of when to send a schedule; cadence may be used as an upper bound for an inter-arrival time of a device 130 that can be scheduled for location/data transmission during a voicecall). The indication may be received from the infrastructure controller 150 in communication with the devices 130 via a backchannel, as described above. The indication may further indicate call states of the voicecall and/or a device 130 on the voicecall. Hence, at the block 1201, the hardware processing unit 203 determines schedules for subscribers (e.g. the devices 130) and transmits a schedule to the devices 130 according to the cadence, for example with a device identifier such that the device 130 may determine whether they have received the "correct" schedule".

In general, a schedule for a device 130 are transmitted in a given order, for example according to device identifiers 371 and the like.

At a block 1203, the hardware processing unit 203 abandons a schedule when one or more of the following conditions are detected: the voicecall is ending; a "B-interface" goes "down" (e.g. a data pipe to a data server, such as the infrastructure controller 150, goes down; in other words, the base station 120 is no longer receiving indications about the voicecall); a "failsoft" condition is detected (e.g. no data server connection); and site trunking is detected (which again results in no data server connection).

In general, when the device 130 receives a schedule, the device 130 acknowledges receipt thereof. However, when no response is received from the device 130 and/or an SUID CRC (cyclic redundancy check) failure occurs (e.g. a data message transmitted by a device 130 fails a CRC) and/or when a NACK due to a bad and/or incorrect SUID occurs (e.g. the device 130 transmits a NACK indicating that it received an incorrect schedule as identified from the associated SUID), the hardware processing unit 203 determines at a block 1205 that the device 130 did not respond.

In general, the hardware processing unit 203 may attempt to transmit a schedule to the device 130 a given number of times (e.g. as depicted, up to four times, such that up to "3" tries may remain when no response is received). When no retries remain, at a block 1207, the hardware processing unit 203 waits until the next cadence and attempts to again send a schedule to the device 130 at the block 1201 (e.g. the cadence is ending, no schedule retries and/or no schedule backup occurs and the hardware processing unit 302 again implements the block 1201.)

Otherwise, when retries remain and the end of the cadence is not hit, at a block 1209, the hardware processing unit 203 places a retry of a transmission of the schedule in a pending state, and a reschedule occurs (e.g. the schedule is again transmitted at the block 1201), according to the cadence.

In some embodiments, as described above, a call state may change and a current schedule for one or more of the devices 130 may be aborted 1211, for example, when the voicecall changes between an active (e.g. voice) state and a hangtime state, or when a device 130 changes from 1/4 scheduling to 4/4 scheduling. In these embodiments, the block 1209 is again implemented to reschedule a device 130 according to the changed call state.

As described above, in some embodiments, a device 130 is generally configured to transmit non-voice data according to the schedule transmitted thereto. However, a device 130 may transmit a NACK indicative that data scheduled to be transmitted is not presently available, such as a location. Alternatively, a NACK may be received from a device 130 which proxies for other devices 130 in a hierarchical fashion (e.g. in a Digital Vehicle Repeater System (DVRS) NACK) indicating that the device 130 may not be presently reachable. Indeed, each NACK received may be received with a reason code indicative of why the NACK has been transmitted.

Some NACKs received may result in a retry of transmission of a pending schedule. For example, when data is not available and/or when data is not available due to a DVRS NACK, at a block 1213, the hardware processing unit 203 determines that a NACK allowing a retry has been received and again reschedules transmission of the schedule at the block 1209.

However, a NACK may be received that does not allow a retry; such NACKs include reason codes for one or more of: "not context activated" (e.g. indicating that a device 130 is not presently capable of transmitting data); data type not supported (e.g. a device 130 may not be able to determine its location); a device not able to perform encryption and/or decryption (e.g. such a NACK may be transmitted in response to receiving a decryption key); a device (e.g. "PSU" or personal subscriber unit) may not be supported by the DVRS of the system 100; and/or an unknown reason and/or MOT DATA (e.g. a device 130 may proxy for other devices, however the base station 120 does not "know" this and attempts to schedule proxied devices 130 which may not support data, resulting in a MOT DATA reason code) and/or unknown reason code is received. In these embodiments, the schedule is not retransmitted, and the base station 120 waits, at a block 1215, for the next call before attempting to schedule the device 130.

Hence, described herein is a device, system and method for preventing audio loss. When a state of a present voicecall associated with a potential collision with data for transmission in at least one data timeslot is determined, cancellation of the transmission of the data occurs. In some embodiments, the at least one data timeslot of a schedule may be a same timeslot used for voice data transmission in other schedules; hence, cancellation of the data transmission in the data time slot may occur when transitioning between schedules to prevent collisions with voice data. In other embodiments, data may be scheduled for transmission in a data time slot, and scheduling data may be received indicating that other data is unexpectedly scheduled for transmission in the same data time slot; hence, cancellation of the data transmission may occur in the event that the unexpected scheduling is due to not receiving an updated schedule. In yet further embodiments, data may be received in a data timeslot not according to previously received scheduling data (e.g. the scheduling data indicates that given data is scheduled to be received, but other data is received); in these embodiments, the current schedule may be cancelled in the event that receipt of the unexpected data is due to not receiving an updated schedule. In yet further embodiments, a schedule may be cancelled when a given number of data decode failures occur, as the data which fails to decide may be indicative of a changed schedule.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication device for managing communications with one or more other communication devices in a voicecall, the communication device comprising:
   a communications unit configured to conduct voicecalls with the with one or more other communication devices;
   a hardware processor communicatively coupled to the communications unit, the hardware processor configured to:
   receive scheduling data, for a plurality of timeslots of a present voicecall with the one or more other communication devices, indicative of when different communication types are to occur in the present voicecall with the one or more other communication devices, the plurality of timeslots including at least one data timeslot for transmitting data on the present voicecall between the one or more other communication devices; and when a state of the present voicecall associated with a potential collision with the data for transmission in the at least one data timeslot is determined, cancel transmission of the data in the at least one data timeslot of the present voicecall.

2. The communication device of claim 1, wherein the hardware processor is further configured to:
when the state of the present voicecall associated with a potential collision is determined, abort all communications for the scheduling data for the present voicecall for a given time window.

3. The communication device of claim 1, wherein the potential collision is between transmitting, at the communication device, the data in the at least one data timeslot and one or more of: transmitting, at the communication device, voice on the present voicecall, receiving, at the communication device, voice on the present voicecall and the one or more other communication devices transmitting respective data on the present voicecall.

4. The communication device of claim 1, wherein the hardware processor is further configured to determine the state of the present voicecall associated with a potential collision by:
detecting a given number of failed data decodes for respective data received in other timeslots.

5. The communication device of claim 1, wherein the hardware processor is further configured to determine the state of the present voicecall associated with a potential collision by:
detecting that at least one other communication device, of the one or more other communication devices, has entered a respective state for transmitting voice on the present voicecall.

6. The communication device of claim 1, wherein the hardware processor is further configured to determine the state of the present voicecall associated with a potential collision by:
detecting that the communication device is changing between states for transmitting voice and not transmitting voice on the present voicecall.

7. The communication device of claim 1, wherein the hardware processor is further configured to determine the state of the present voicecall associated with a potential collision by:
detecting that scheduling is changing between 4/4 scheduling, 1/4 scheduling and hangtime scheduling on the present voicecall.

8. The communication device of claim 1, wherein the hardware processor is further configured to determine the state of the present voicecall associated with a potential collision is determined by:
determining that at least one other communication device, of the one or more other communication devices, has been scheduled to transmit the respective data in the at least one data timeslot for transmitting data on the present voicecall.

9. The communication device of claim 1, wherein the hardware processor is further configured to determine the state of the present voicecall associated with a potential collision is determined by:
determining that the at least one data timeslot for transmitting the data on the present voicecall has changed from a first timeslot to a second timeslot.

10. The communication device of claim 1, wherein the hardware processor is further configured to cancel the transmission of the data in the at least one data timeslot when one or more of:

an indication is received that the present voicecall is ending;
the present voicecall changes between an active state and an inactive state;
further scheduling data is received; and
a channel change indication is received indicative of changing from a first channel, on which the present voicecall is occurring, to a second channel.

11. A method at a communication device for managing communications with one or more other communication devices in a voicecall, the communication device, the method comprising:
receiving, at a hardware processor, of the communication device, communicatively coupled to a communications unit of the communication device, configured to conduct voicecalls with the one or more other communication devices, scheduling data, for a plurality of timeslots of a present voicecall, indicative of when different communication types are to occur in the present voicecall with the one or more other communication devices, the plurality of timeslots including at least one data timeslot for transmitting data on the present voicecall between the one or more other communication devices; and
when a state of the present voicecall associated with a potential collision with the data for transmission in the at least one data timeslot is determined, cancelling, at the hardware processor, transmission of the data in the at least one data timeslot of the present voicecall.

12. The method of claim 11, further comprising:
when the state of the present voicecall associated with a potential collision is determined, aborting, at the communication device, all communications for the scheduling data for the present voicecall for a given time window.

13. The method of claim 11, wherein the potential collision is between transmitting, at the communication device, the data in the at least one data timeslot and one or more of: transmitting, at the communication device, voice on the present voicecall, receiving, at the communication device, voice on the present voicecall and the one or more other communication devices transmitting respective data on the present voicecall.

14. The method of claim 11, further comprising determining the state of the present voicecall associated with a potential collision by:
detecting a given number of failed data decodes for respective data received in other timeslots.

15. The method of claim 11, further comprising determining the state of the present voicecall associated with a potential collision by:
detecting that at least one other communication device, of the one or more other communication devices, has entered a respective state for transmitting voice on the present voicecall.

16. The method of claim 11, further comprising determining the state of the present voicecall associated with a potential collision by:
detecting that scheduling for the communication device is changing between states for transmitting voice and not transmitting voice on the present voicecall.

17. The method of claim 11, further comprising determining the state of the present voicecall associated with a potential collision by:
detecting that scheduling is changing between 4/4 scheduling, 1/4 scheduling and hangtime scheduling on the present voicecall.

18. The method of claim 11, further comprising determining the state of the present voicecall associated with a potential collision is determined by:
   determining that at least one other communication device, of the one or more other communication devices, has been scheduled to transmit the respective data in the at least one data timeslot for transmitting data on the present voicecall.

19. The method of claim 11, further comprising determining the state of the present voicecall associated with a potential collision is determined by:
   determining that the at least one data timeslot for transmitting the data on the present voicecall has changed from a first timeslot to a second timeslot.

20. The method of claim 11, further comprising cancelling the transmission of the data in the at least one data timeslot when one or more of:
   an indication is received that the present voicecall is ending;
   the present voicecall changes between an active state and an inactive state;
   further scheduling data is received; and
   a channel change indication is received indicative of changing from a first channel, on which the present voicecall is occurring, to a second channel.

* * * * *